United States Patent [19]

Sigl

[11] Patent Number: 5,417,483
[45] Date of Patent: May 23, 1995

[54] HYDRAULIC BRAKE SYSTEM WITH DUAL BRAKE LINES CONNECTED BY A LINE WITH A PRESSURE CONTROL DEVICE

[75] Inventor: Alfred Sigl, Sersheim, Germany

[73] Assignee: Robert Bosch GmbH, Stuttgart, Germany

[21] Appl. No.: 30,966

[22] Filed: Mar. 12, 1993

[30] Foreign Application Priority Data

Apr. 1, 1992 [DE] Germany ............... 42 10 745.8

[51] Int. Cl.⁶ .................................................. B60T 8/32
[52] U.S. Cl. ................................. 303/113.5; 303/116.1
[58] Field of Search ................... 303/9.71, 111, 113.5, 303/116.1, 116.2, 119.1, 84.1, DIG. 1, DIG. 2, 900, 901

[56] References Cited

U.S. PATENT DOCUMENTS

| | | |
|---|---|---|
| 4,936,638 | 6/1990 | Burgdorf ..................... 303/900 X |
| 5,021,957 | 6/1991 | Yoshino et al. ............ 303/113.5 X |
| 5,125,721 | 6/1992 | Schmidt et al. ............... 303/9.62 |
| 5,178,442 | 1/1993 | Toda et al. .................. 303/116.1 |

FOREIGN PATENT DOCUMENTS

| | | | |
|---|---|---|---|
| 3284458 | 12/1991 | Japan ............................. 303/113.5 |
| 2250070 | 5/1992 | United Kingdom ............. 303/116.2 |

*Primary Examiner*—Josie A. Ballato
*Attorney, Agent, or Firm*—Edwin E. Greigg; Ronald E. Greigg

[57] ABSTRACT

A hydraulic brake system with an antilock mechanism having a pressure control device is disposed in a connecting line, which joins two brake line branches with each other; in an event of a failure of the antilock mechanism, upon an actuation of a master cylinder, this device reduces the pressure of the pressure fluid in the brake cylinders associated with the second brake line branches in relation to the pressure in the brake cylinders associated with the first brake line branches. The hydraulic brake system is especially suitable for application in motor vehicles.

24 Claims, 2 Drawing Sheets

HYDRAULIC BRAKE SYSTEM WITH DUAL BRAKE LINES CONNECTED BY A LINE WITH A PRESSURE CONTROL DEVICE

BACKGROUND OF THE INVENTION

The invention is based on a hydraulic brake system with an antilock mechanism especially for motor vehicles as defined hereinafter. German patent application P 40 36 940.4 (U.S. Pat. No. 5,125,721) has already proposed a brake system for a motor vehicle that has a pulsed magnet valve which is closed when without current disposed in a brake line branch associated with at least one rear wheel brake cylinder. A pressure control device with a check valve is disposed parallel to the pulsed magnet valve in a bypass, and this device upon a failure of the antilock mechanism, makes possible a reduced pressure rise in the rear wheel brake cylinders. The pulsed opening of the magnet valve for example associated with both of the rear wheel brake cylinders of the brake system makes possible a reduced pressure rise in the rear wheel brake cylinders and so avoids locking of the rear wheels before locking of the front wheels of the vehicle. However, this brake system has the disadvantage of a comparatively complicated design and high expenditure for controlling the pulsed opening of the magnet valve or valves associated with the rear wheel brake line branches. Moreover, due to the pulsed opening of the magnet valve, sacrifices in comfort arise in the form of an increased generation of noise.

OBJECT AND SUMMARY OF THE INVENTION

The brake system according to the invention has an advantage over the prior art of a simple construction and simple triggering of the magnet valves. Sacrifices in comfort due to a pulsed opening or closing of the magnet valves during normal brake operation are avoided. The pressure control device disposed in the at least one connecting line prevents, in a simple manner, locking of the vehicle wheel associated with the at least one second brake line branch before locking of the vehicle wheel associated with the at least one first brake line branch.

In order to avoid a locking of the rear wheels before the locking of the front wheels of the vehicle and thereby to guarantee the driving stability of the vehicle even during braking with high brake pressures, it is especially advantageous if the connecting line joins a first brake line branch associated with at least one front wheel of the vehicle to a second brake line branch associated with at least one rear wheel of the vehicle.

It is advantageous if the pressure control device, when a predetermined pressure is exceeded, functions as a proportional pressure regulating valve, which reduces the pressure on the outlet side by a fixed proportion relative to the pressure on the inlet side, and thus especially effectively prevents a locking of at least one vehicle wheel associated with a second brake line branch before the locking of at least one vehicle wheel associated with a first brake line branch.

For the same reason it is likewise advantageous if the pressure control device functions as a spring-loaded check valve which reduces the pressure on the outlet side relative to the pressure on the inlet side by a fixed proportion.

To prevent the pressure fluid from flowing through the at least one connecting line from a second to a first brake line branch, it is advantageous if a check valve is disposed in the at least one connecting line in the direction of flow from a first to a second brake line branch, which allows only a flow from the first brake line branch in the direction of the second brake line branch.

It is likewise advantageous if a throttle is disposed in the at least one connecting line, which delays the pressure buildup in the at least one wheel brake cylinder associated with a second brake line branch and thus reduces the danger of a locking of the vehicle wheel associated with the wheel brake cylinder.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
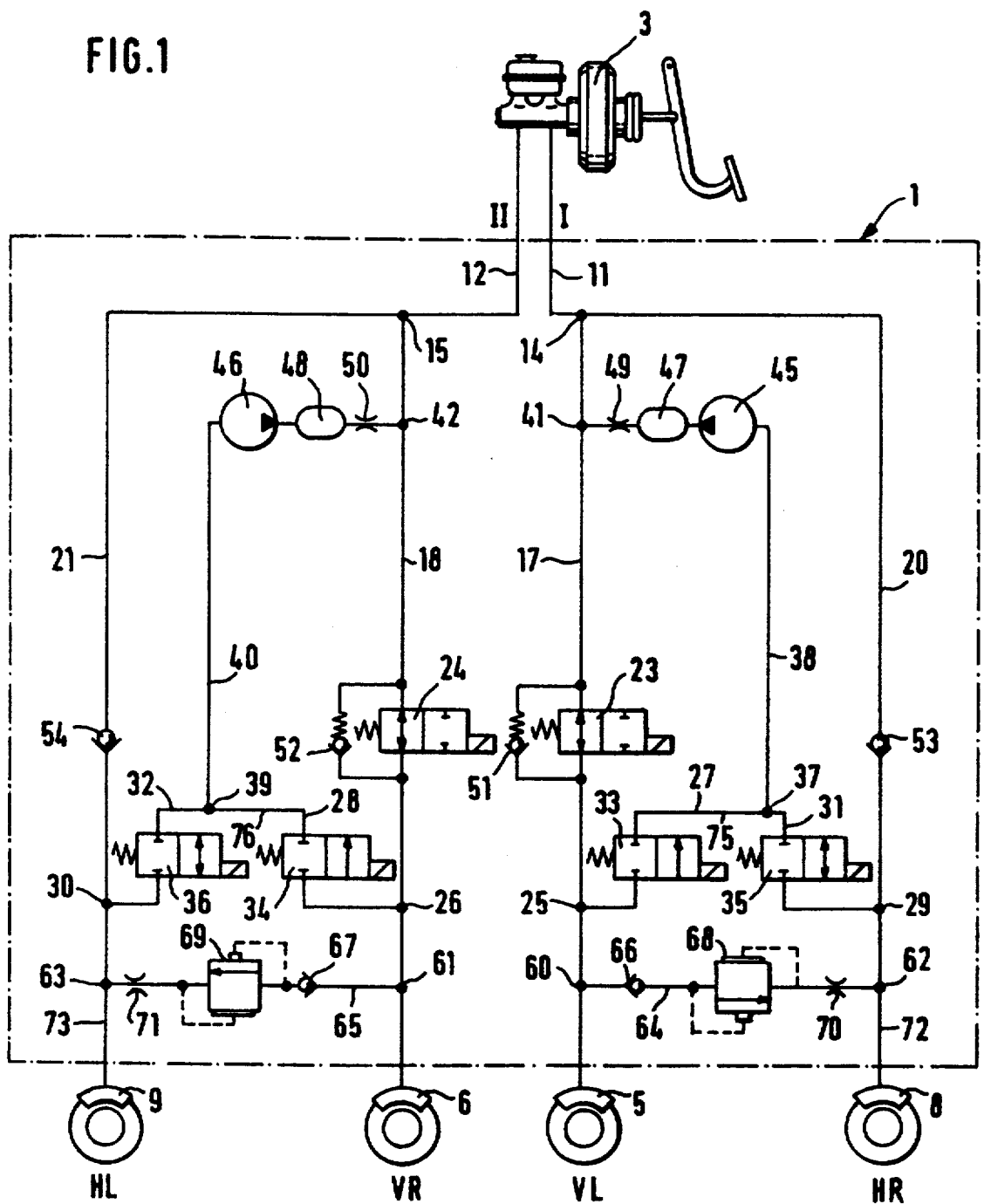
FIG. 1 shows a circuit diagram of a first exemplary embodiment of a hydraulic brake system according to the invention and FIG. 2 shows a circuit diagram of a second exemplary embodiment of a hydraulic brake system according to the invention.
Figure 2:
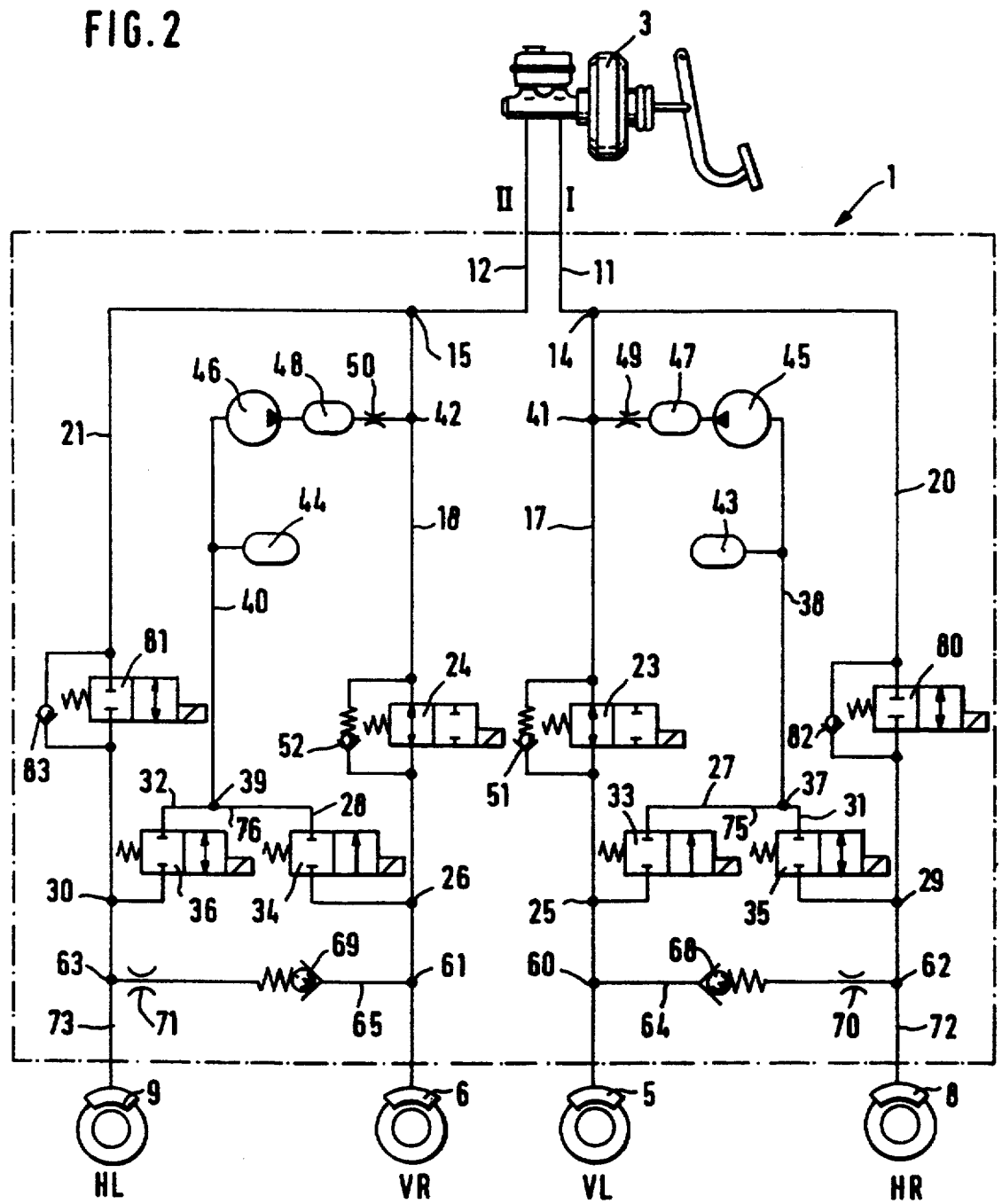

The hydraulic antilock brake systems for motor vehicles shown by way of example in FIGS. 1 and 2 have a pedal actuated master cylinder 3, to which are connected two brake circuits I and II. Brake circuit I has a brake line 11 leading from the master cylinder 3 to a brake cylinder 5, which is associated with a front wheel of the vehicle, and to a brake cylinder 8, which is associated with a rear wheel disposed diagonally to this front wheel. Brake circuit II comprises a brake line 12 leading from the master cylinder 3 to a brake cylinder 6, which is associated with a front wheel of the vehicle, and to a brake cylinder 9, which is associated with a rear wheel of the vehicle disposed diagonally to this front wheel. The brake lines 11 and 12 branch off at connecting points 14, 15 each into a first brake line branch 17, 18 and a second brake line branch 20, 21. The first brake line branches 17, 18 are associated with the brake cylinders 5, 6, acting on the front wheels of the vehicle, and the second brake line branches 20, 21 are associated with the brake cylinders 8, 9, acting on the rear wheels of the vehicle. In each of the first brake line branches 17, 18 is disposed an inlet valve 23, 24 in the form of an electromagnetically actuatable 2/2-way valve, which is open in the absence of current, by means of which the pressure in the brake cylinders 5, 6 can be controlled. One return line branch 27, 28 splits off at connecting points 25, 26 from the first brake line branches 17, 18 on the brake cylinder side of the inlet valve 23, 24. One return line branch 31, 32 splits off from each of the second brake line branches 20, 21 at connecting points 29, 30. In each of the return line branches 27, 28, 31, 32 is disposed one outlet valve 33, 34, 35, 36 in the form of an electromagnetically actuatable 2/2-way valve, which is closed in the absence of current, and which upon operation of the antilock mechanism makes possible the reduction of pressure in the brake cylinders 5, 6, 8, 9. Remote from the brake cylinders 5, 8, the return line branches 27, 31 come together into a common return line 38 at a connecting point 37 downstream of the outlet valves 33, 35, and remote from the brake cylinders 6, 9, the return line branches 28, 32 come together into a common return line 40 at a connecting point 39 downstream of the outlet valves 34, 36.

The first return line 38 is joined with the first brake line branch 17, for example between the connecting point 14 and the inlet valve 23, at a connecting point 41. The second return line 40 is joined with the first brake line branch 18, for example between the connecting point 15 and the inlet valve 24, at a connecting point 42. A return pump 45, 46, a damper chamber 47, 48, and a throttle 49, 50 are disposed one after another in the return lines 38, 40 in the direction of the return flow to the connecting points 41, 42.

One check valve 51, 52 which for example is spring-loaded, is provided parallel to each of the inlet valves 23, 24 disposed in the first brake line branches 17, 18; it makes possible a return flow of the pressure fluid through the first brake line branches 17, 18, bypassing the inlet valves 23, 24, toward the master cylinder 3 as long as the prevailing pressure of the pressure fluid on the brake cylinder side of the check valves 51, 52 exceeds the prevailing pressure on the master cylinder side of the check valves by a value predetermined by the spring force of the check valves, thus causing the check valves 51, 52 to open toward the master cylinder 3.

In each of the second brake line branches 20, 21, for example between the connecting points 14, 15 of the brake lines 11, 12 and the connecting points 29, 30, is disposed one check valve 53, 54, which for example is not spring-loaded and which, in the event that the prevailing pressure of the pressure fluid on the brake cylinder side of the check valves 53, 54 exceeds the pressure on the master cylinder side of the check valves, makes possible a return flow of the pressure fluid out of the brake cylinders 8, 9 associated with the rear wheels of the vehicle, through the second brake line branches 20, 21 toward the master cylinder 3. In this manner a pressure reduction in the brake cylinders 8, 9 and thus a release of the rear wheel brakes of the vehicle is guaranteed, even in the event of a failure of the antilock mechanism.

One connecting point 60, 61 is provided in each of the first brake line branches 17, 18 between the inlet valves 23, 24 and the brake cylinders 5, 6 associated with the front wheels of the vehicle in the exemplary embodiments shown in FIG. 1 and FIG. 2, by way of example between the connecting points 25, 26 of the return line branches 27, 28 and the brake cylinders 5, 6; One connecting point 62, 63 is provided in each of the second brake line branches 20, 21 between the connecting points 29, 30 of the return line branches 31, 32 and the brake cylinders 8, 9 associated with the rear wheels of the vehicle. The connecting points 60 and 62 of brake circuit I are joined by means of a connecting line 64 and the connecting points 61 and 63 of brake circuit II are joined by means of a connecting line 65. A check valve 66, 67, a pressure control device 68, 69, and a throttle 70, 71, for example, are disposed one after the other in the connecting lines 64, 65 in the direction from connecting points 60, 61 of the first brake line branches 17, 18 to the connecting points 62, 63 of the second brake line branches 20, 21 in the direction of flow of the pressure fluid. The check valve 66, 67 which, for example, is not spring-loaded, opens toward the second brake line branch 20, 21 and makes possible a flow of the pressure fluid through the connecting line 64, 65 from the first brake line branch 17, 18 to the second brake line branch 20, 21, but not, however, in the reverse direction. The pressure control device 68, 69 shown in FIG. 1 in first exemplary embodiment of the brake system, is embodied as a proportional pressure regulating valve which, if a preset, characteristic pressure value is exceeded, reduces the pressure prevailing on its outlet side, associated with the second brake line branch 20, 21, by a fixed proportion relative to the pressure prevailing on its inlet side, associated with the first brake line branch 17, 18.

Upon actuation of the master cylinder 3, brake pressure can be generated in the brake cylinders 5, 6, 8, 9. The pressure buildup phase, in which the pressure in the brake cylinders 5, 6, 8, 9 increases, finds the inlet valves 23, 24, which are disposed in the first brake line branches 17, 18, in their spring-actuated open positions and the outlet valves 33, 34, 35, 36, which are disposed in the return line branches 27, 28, 31, 32, in their spring-actuated closed positions. The pressure fluid flows through the first brake line branches 17, 18 directly into the brake cylinders 5, 6 associated with the front wheels of the vehicle and via the connecting lines 64, 65, which have check valves 66, 67, pressure control devices 68, 69, and throttles 70, 71 disposed in them, into the second brake line branches 20, 21, and from there into the brake cylinders 8, 9 associated with the rear wheels of the vehicle. Thus, upon the exceeding of a preset, characteristic pressure value by the prevailing pressure of the pressure fluid in the connecting lines 64, 65, the pressure control devices 68, 69, embodied as proportional pressure regulating valves, bring about a reduction of the current outlet pressure of the pressure control devices 68, 69 in relation to the inlet pressure by a fixed proportion, and the throttles 70, 71 a delayed pressure rise in the brake cylinders 8, 9 associated with the rear wheels of the vehicle. In this manner the danger of a locking of the rear wheels before the locking of the front wheels of the vehicle is avoided.

The hydraulic brake system 1 according to the first exemplary embodiment of the invention affords the possibility that the function of the pressure control devices 68, 69 during each braking event can be circumvented during normal braking operation by electromagnetically switching the outlet valves 33, 35 of brake circuit I as well as the outlet valves 34, 36 of brake circuit II to their open positions, so that the return line branches 27, 31 and the return line branches 28, 32 each form one bypass line 75, 76 parallel to the respective connecting line 64, 65. In this manner the brake cylinders 8, 9 associated with the rear wheels of the vehicle can better assist the braking of the vehicle and as a result the possible braking of the vehicle can be improved.

If during braking, locking of least one of the vehicle wheels threatens to occur, the inlet valves 23, 24 and the outlet valves 33, 34, 35, 36 of the antilock mechanism will be triggered by means of an electronic triggering device (not shown) in accordance with a known, adaptive, control algorithm in such a way as to result in an optimized brake pressure modulation for the breaking conditions in the brake cylinders 5, 6, 8, 9. If for example the pressure of the pressure fluid in the brake cylinders 5, 6 drops off in order to prevent a locking of the front vehicle wheels, then the inlet valves 23, 24 are closed and the outlet valves 33, 34 are opened so that with the use of the return pumps 45, 46 the pressure fluid flows through the return line branches 27, 28 and the return lines 38, 40 toward the master cylinder 3 and a faster reduction of pressure in the brake cylinders takes place. In this pressure reduction phase the inlet valves 23, 24 are in a closed position and the outlet valves 33, 34 are in an open position. The return pumps 45, 46 are switched on for the entire time the antilock mechanism is in operation and feed the pressure fluid from the return lines 38, 40 into the first brake line branches 17, 18. If the pressure of the pressure fluid in the brake cylinders associated with the rear wheels of the vehicle is to be decreased in order to prevent locking of the rear wheels of the vehicle, then the outlet valves 35, 36 will be opened so that the pressure fluid flows via the return line branches 31, 32 into the return lines 38, 40 and from there will be fed into each first brake line branch 17, 18.

The damper chambers 47, 48 on the pressure side of the return pumps 45, 46 serve as hydraulic dampers in conjunction with the throttles 49, 50. In a pressure holding phase of the function of the antilock mechanism, in which the pressure of the pressure fluid in at least one of the brake cylinders 5, 6, 8, 9 should be kept constant, both the associated inlet valves 23, 24 and the associated outlet valves 33, 34, 35, 36 are switched to their closed positions.

In the event of a failure of the antilock mechanism, the hydraulic brake system 1, the pressure control devices 68, 69 disposed in the connecting lines 64, 65 serve to prevent premature locking of the rear wheels before the locking of the front wheels of the vehicle and thus also to maintain the driving stability of the vehicle during braking. To this end, in the event of a failure of the antilock mechanism, the power supply to the inlet valves 23, 24 and to the outlet valves 33, 34, 35, 36 will be interrupted, so that the inlet valves 23, 24 assume their spring-actuated open positions and the outlet valves 33, 34, 35, 36 assume their spring-actuated closed positions. When the master cylinder 3 is actuated, quantities of pressure fluid will be thrust through the brake lines 11, 12 and the first brake line branches 17, 18 into the brake cylinders 5, 6 associated with the front wheels of the vehicle. Some of the pressure fluid flows through the connecting lines 64, 65 having the check valves 66, 67, the pressure control devices 68, 69, and the throttles 70, 71 into the brake cylinder side sections 72, 73 of the second brake line branches 20, 21 and from there into the brake cylinders 8, 9 associated with the rear wheels of the vehicle. In the event that the pressure of the pressure fluid on the inlet side, oriented toward the first brake line branches 17, 18, of the pressure control devices 68, 69, which function as proportional pressure regulating valves, exceeds a preset, characteristic pressure value of the pressure control devices, then the prevailing pressure of the pressure fluid on the outlet side of the pressure control devices 68, 69, associated with each of the second brake line branches 20, 21 is reduced, in relation to the pressure on the inlet side by a fixed proportion, which depends on the pressure of the pressure fluid and on the design of the pressure control devices 68, 69, which function as proportional pressure regulating valves. In this manner, the prevailing pressure of the pressure fluid in the brake cylinders 8, 9 associated with the rear wheels of the vehicle, in relation to the pressure prevailing in the brake cylinders 5, 6 associated with the front wheels of the vehicle, is reduced by a fixed proportion, if the preset, characteristic pressure value of the pressure fluid is exceeded. The throttles 70, 71 disposed in the connecting lines 64, 65, for example between the pressure control devices 68, 69 and the connecting points 62, 63 of the second brake line branches 20, 21, bring about a delayed pressure rise in the brake cylinders 8, 9 associated with the rear wheels of the vehicle, compared with the brake cylinders 5, 6 associated with the front wheels of the vehicle. In this manner a locking of the rear wheels before the locking of the front wheels of the vehicle is effectively prevented, and the driving stability of the vehicle is preserved, even in the event of a failure of the antilock mechanism during braking. The check valves 53, 54 disposed in the second brake line branches 20, 21 make possible a release of the pressure in the brake cylinders 8, 9 and thus a release of the rear wheel brakes of the vehicle, by allowing the pressure fluid to flow through the second brake line branches 20, 21 toward the master cylinder 3, if the pressure on the master cylinder side of the check valves 53, 54 falls below the pressure on the brake cylinder side.

FIG. 2 shows a second exemplary embodiment of a hydraulic brake system according to the invention, in which elements that are the same and function in the same way are identified by the same reference numerals as in FIG. 1. In relation to the first exemplary embodiment shown in FIG. 1, the second exemplary embodiment differs substantially only in that a-storage-chamber 43 is disposed in the first return line 38 of brake circuit I and that a storage chamber 44 is disposed in the second return line 40 of brake circuit II. The storage chambers 43, 44 make possible an especially rapid pressure reduction in the brake cylinders 5, 6, 8, 9 in the operation to the antilock mechanism of the hydraulic brake system 1.

In order to achieve the same possibility in the second exemplary embodiment as in the first exemplary embodiment shown in FIG. 1, that upon actuation of the master cylinder 3 in normal brake operation, the pressure fluid will reach the brake cylinders 8, 9 associated with the rear wheels of the vehicle unreduced in quantity except for flow losses, an inlet valve 80, 81, for example in the form of an electromagnetically actuatable 2/2-way valve that is closed in the absence of current, is disposed in lieu of the check valves 53, 54 in each of the second brake line branches 20, 21 associated with the brake cylinders 8, 9, which in the excited state makes possible the pressure buildup in the brake cylinders 8, 9, by circumvention of the connecting lines 64, 65. Parallel to each of the inlet valves 80, 81 a check valve 82, 83, which for example is not spring-loaded, is provided, which opens toward the master cylinder 3 and allows a return flow of the pressure fluid toward the master cylinder 3 in the event that the pressure of the pressure fluid on the master cylinder side of the check valves 82, 83 falls short of the pressure on the brake cylinder side.

The pressure control devices 68, 69 in the second exemplary embodiment shown in FIG. 2 function as spring-loaded check valves, which open a passage toward the sections 72, 73 on the brake cylinder side of the second brake line branches 20, 21, in the event that the pressure of the pressure fluid prevailing on the inlet sides associated with the first brake line branches 17, 18 exceeds the pressure prevailing on the outlet side by a characteristic pressure preset by the spring force of the pressure control device 68 or 69. The check valves 66, 67 disposed in the connecting lines 64, 65 according to FIG. 1 can be omitted in the second exemplary embodiment because their task of preventing a flow of the pressure fluid through the connecting lines 64, 65 from the second brake line branches 20, 21 to the first brake line branches 17, 18 is also performed by means of the pressure control devices 68, 69, that function as spring-loaded check valves.

In the pressure buildup phase, in which pressure in the brake cylinders 5, 6, 8, 9 is built up by means of the actuation of the master cylinder 3, the inlet valves 23, 24, 80, 81 are in an open position and the outlet valves 33, 34, 35, 36 are in a closed position. If during braking, locking threatens in at least one of the vehicle wheels, the associated inlet valves 23, 24, 80, 81 and the associated outlet valves 33, 34, 35, 36 will be triggered by means of an electronic triggering device (not shown) in accordance with a known, adaptive, control algorithm, in such a way as to result in an optimized brake pressure modulation for the braking conditions in the associated brake cylinders 5, 6, 8, 9. If for example the pressure of the pressure fluid in the brake cylinders 5, 6 drops off in order to prevent a locking of the rear vehicle wheels, then the inlet valves 80, 81 are closed and the outlet valves 35, 36 are opened so that the pressure fluid flows into the storage chambers 43, 44 and a rapid pressure reduction takes place in the brake cylinders 8, 9.

The return pumps 45, 46 are switched on throughout the entire operation of the antilock mechanism and feed the pressure fluid out of the storage chambers 43, 44, disposed on the suction side of the return pumps 45, 46, for example into the first brake line branches 17, 18. In a pressure holding phase, in which the pressure of the pressure fluid in the brake cylinders 8, 9 should be kept constant, both the inlet valves 80, 81 and the outlet valves 35, 36 are switched to their closed positions. In this pressure holding phase it is possible that pressure fluid from one of the first brake line branches 17, 18 will reach one of the second brake line branches 20, 21, as long as the pressure of the pressure fluid in the first brake line branches 17, 18 is greater than the prevailing pressure of the pressure fluid in the brake cylinders 8, 9 by a characteristic opening pressure preset by the spring force the pressure control device 68, 69, which functions as a spring-loaded check valve. Hence, the pressure control devices 68, 69, which function in the second exemplary embodiment as spring-loaded check valves and which are disposed in the connecting lines 64, 65, perform no function either in normal braking of the vehicle or in the operation of the antilock mechanism.

In a failure of the antilock mechanism of the hydraulic brake system 1, the pressure control devices 68, 69 disposed in the connecting lines 64, 65, which function as spring-loaded check valves and which reduce the pressure on the outlet side relative to the pressure of the pressure fluid on the inlet side by a fixed proportion, serve to prevent premature locking of the rear wheels before a locking of the front wheels of the vehicle and thus serve to preserve the driving stability of the vehicle, even during braking. To this end, in the event of a failure of the antilock mechanism, the power supply to the inlet valves 23, 24, 80, 81 and to the outlet valves 33, 34, 35, 36 will be interrupted thereby causing them to assume their spring actuated positions. When the master cylinder 3 is actuated, quantities of pressure fluid will be thrust through the brake lines 11, 12 and the first brake line branches 17, 18 having inlet valves 23, 24, which are open in the absence of current, toward the brake cylinders 5, 6 associated with the front wheels of the vehicle. In the event that the pressure of the pressure fluid on the inlet side, oriented toward the first brake line branch 17, 18, of the pressure control device 68, 69, which functions as a spring-loaded check valve, exceeds a pressure prevailing on the outlet side, oriented toward the second brake line branch 20, 21, by a characteristic pressure value preset by the spring force of the check valve, then the pressure control device 68, 69, which functions as a check valve, opens and allows a passage for the pressure fluid from the first brake line branch 17, 18, through the connecting line 64, 65, and into the section 72, 73 on the brake cylinder side of the second brake line branch 20, 21 toward the brake cylinders 8, 9 associated with the rear wheels of the vehicle. Thus, the pressure of the pressure fluid on the outlet side of the pressure control device 68, 69 will be reduced in relation to the pressure on the inlet side by a characteristic pressure value corresponding to the opening pressure of the pressure control device 68, 69, which functions as a spring-loaded check valve, so that in a failure of the antilock mechanism, the pressure in the brake cylinders 8, 9 associated with the rear wheels of the vehicle is reduced in relation to the pressure in the brake cylinders 5, 6 associated with the front wheels of the vehicle. The throttles 70, 71, disposed in the connecting lines 64, 65 on the outlet side of the pressure control devices 68, 69, oriented toward the brake cylinders 8, 9 moreover delay the pressure rise in the brake cylinders 8, 9. In this manner locking of the rear wheels before locking of the front wheels of the vehicle is effectively prevented and thus the driving stability of the vehicle is preserved, even during braking. The check valves 51, 52, which for example are spring-loaded and which are disposed parallel to the inlet valves 23, 24 and the check valves 82, 83, which for example are not spring-loaded and are disposed parallel to the inlet valves 80, 81, make possible a release of the pressure in the brake cylinders 5, 6, 8, 9 and thus a release of the brakes of the vehicle, as long as the pressure prevailing on the brake cylinder side of each of the check valves 51, 52, 82, 83 exceeds the pressure prevailing on the master cylinder side of each of the check valves by a respective characteristic, preset value.

In the event of a failure of the antilock mechanism, the hydraulic brake system 1 according to the invention, having one pressure control device 68, 69 in each of the connecting lines 64, 65, which join the first brake line branches 17, 18 to the second brake line branches 20, 21, avoids locking of the rear wheels before locking of the front wheels of the vehicle in a simple manner, and so assures the driving stability of the vehicle while braking.

The foregoing relates to preferred exemplary embodiments of the invention, it being understood that other variants and embodiments thereof are possible within the spirit and scope of the invention, the latter being defined by the following claims.

What is claimed and desired to be secured by Letters Patent of the United States is:

1. A hydraulic brake system with an antilock mechanism especially for motor vehicles provided with a master cylinder and front and rear brake cylinders, having at least one brake line carrying pressure fluid between the master cylinder and the brake cylinders, at least one first brake line branch (17, 18) and at least one second brake line branch (20, 21) connected with the front and rear brake cylinders, at least one return line branch (27, 28, 31, 32) originating at said at least one first brake line branch and said at least one second brake line branch at a connecting point (25, 26, 29, 30), the at least one first brake line branch (17, 18) and the at least one second brake line branch (20, 21) are joined with one another by means of at least one connecting line (64, 65), and that a pressure control device (68, 69) is disposed in the connecting line (64, 65), and a check valve (66, 67) is disposed in the at least one connecting line (64, 65) in a direction of the flow from the at least one first brake line branch (17, 18) to the at least one second brake line branch (20, 21) upstream of the pressure control device (68, 69).

2. A hydraulic brake system as defined by claim 1, in which upon exceeding a preset pressure of the pressure fluid, the pressure control device (68, 69) functions as a proportional pressure regulating valve which reduces the pressure on an outlet side of said pressure control device (68, 69) by a fixed proportion in relation to the pressure on an inlet side of said pressure control device.

3. A hydraulic brake system as defined by claim 2, in which a non-spring-loaded check valve (53, 54) is disposed in the at least one second brake line branch (20, 21) associated with at least one rear wheel of the motor vehicle.

4. A hydraulic brake system as defined by claim 1, in which the pressure control device (68, 69) functions as a spring-loaded pressure difference valve which reduces the pressure on an outlet side of said pressure control device (68, 69) by a fixed value in relation to the pressure of the pressure fluid on an inlet side of said pressure control device.

5. A hydraulic brake system as defined by claim 4, in which a throttle (70, 71) is disposed in the at least one connecting line (64, 65).

6. A hydraulic brake system as defined by claim 1, in which a throttle (70, 71) is disposed in the at least one connecting line (64, 65).

7. A hydraulic brake system as defined by claim 1, in which the at least one connecting line (64, 65) joins together the at least one first brake line branch (17, 18) associated with at least one front wheel of the vehicle and said at least one second brake line branch (20, 21) associated with at least one rear wheel of the vehicle.

8. A hydraulic brake system as defined by claim 7, in which a non-spring-loaded check valve (53, 54) is disposed in the at least one second brake line branch (20, 21) associated with the at least one rear wheel of the motor vehicle.

9. A hydraulic brake system as defined by claim 1, in which a non-spring-loaded check valve (53, 54) is disposed in the at least one second brake line branch (20, 21) associated with at least one rear wheel of the motor vehicle.

10. A hydraulic brake system with an antilock mechanism especially for motor vehicles provided with a master cylinder and at least one front brake cylinder (5, 6) and at least one rear brake cylinder (8, 9) having at least one brake line (11, 12) carrying pressure fluid between the master cylinder and the said brake cylinders, a normally open inlet valve (23, 24) in each of said brake lines (11, 12), at least one first brake line branch (17, 18) and at least one second brake line branch (20, 21) oriented toward said at least one front and said at least one rear brake cylinders, at least one return line branch (27, 28, 31, 32) originating at each said brake line branch and terminating at a respective connecting point (37, 38), a normally closed outlet valve (33, 34, 35, 36) in each of said at least one return line branch, each of said connecting points is connected directly to a respective return pump (45, 46), said respective return pump (45, 46) is joined to said respective at least one brake line (11, 12) between said master brake cylinder and said normally open inlet valve ,(23, 24), the at least one first brake line branch (17, 18) and the at least one second brake line branch (20, 21) are joined with one another by means of a at least one connecting line (64, 65), and that a pressure control device (68, 69) is disposed in the at least one connecting line (64, 65) and having a flow through direction from said at least one front brake cylinder to said at least one rear brake cylinder, and a check valve (53, 54) between each said at least one rear brake cylinder (8, 9) and said master brake cylinder for flow direction from the respective at least one rear brake cylinder to said master brake cylinder.

11. A hydraulic brake system as defined by claim 10, in which a second check valve (66, 67) is disposed in the at least one connecting line (64, 65) in a direction of the flow from the at least one first brake line branch (17, 18) to the at least one second brake line branch (20, 21) upstream of the pressure control device (68, 69).

12. A hydraulic brake system as defined by claim 10, in which a throttle (70, 71) is disposed in the at least one connecting line (64, 65).

13. A hydraulic brake system as defined by claim 10, in which the check valve is a non-spring-loaded check valve ( 53, 54 ) disposed in the at least one second brake line branch (20, 21) associated with at least one rear wheel of the motor vehicle.

14. A hydraulic brake system as defined by claim 10, in which upon exceeding a preset pressure of the pressure fluid, the pressure control device (68, 69) functions as a proportional pressure regulating valve which reduces the pressure on an outlet side of said pressure control device (68, 69) by a fixed proportion in relation to the pressure on an inlet side of said pressure control device.

15. A hydraulic brake system as defined by claim 10, in which the pressure control device (68, 69) functions as a spring-loaded pressure difference valve which reduces the pressure on an outlet side of said pressure control device (68, 69) by a fixed value in relation to the pressure of the pressure fluid on an inlet side of said pressure control device.

16. A hydraulic brake system with an antilock mechanism especially for motor vehicles provided with a master cylinder and front and rear brake cylinders, having at least one brake line carrying pressure fluid between the master cylinder and the brake cylinders, at least one first brake line branch (17, 18) and at least one second brake line branch (20, 21) connected with the front and rear brake cylinders, at least one return line branch (27, 28, 31, 32) originating at said at least one first brake line branch and said at least one second brake line branch at a connecting point (25, 26, 29, 30), the at least one first brake line branch (17, 18) and the at least one second brake line branch (20, 21) are joined with one another by means of at least one connecting line (64, 65), and that a pressure control device (68, 69) is disposed in the at least one connecting line (64, 65), a throttle (70, 71) is disposed in the at least one connecting line (64, 65), and upon exceeding a preset pressure of the pressure fluid, the pressure control device (68, 69) functions as a proportional pressure regulating valve which reduces the pressure on an outlet side of said pressure control device (68, 69) by a fixed proportion in relation to the pressure on an inlet side of said pressure control device.

17. A hydraulic brake system with an antilock mechanism especially for motor vehicles provided with a master cylinder and front and rear brake cylinders, having at least one brake line carrying pressure fluid between the master cylinder and the brake cylinders, at least one first brake line branch (17, 18) and at least one second brake line branch (20, 21) connected with the front and rear brake cylinders, at least one return line branch (27, 28, 31, 32) originating at said at least one first brake line branch and said at least one second brake line branch at a connecting point (25, 26, 29, 30), the at least one first brake line branch (17, 18) and the at least one second brake line branch (20, 21) are joined with one another by means of at least one connecting line (64, 65), and that a pressure control device (68, 69) is disposed in the at least one connecting line (64, 65), a non-spring-loaded check valve (53, 54) is disposed in the at least one second brake line branch (20, 21) associated with at least one rear wheel of the motor vehicle, and the pressure control device (68, 69) functions as a spring-loaded pressure difference valve which reduces the pressure on an outlet side of said pressure control device (68, 69) by a fixed value in relation to the pressure of the pressure fluid on an inlet side of said pressure control device.

18. A hydraulic brake system with an antilock mechanism especially for motor vehicle provided with a master cylinder and front and rear brake cylinders, having at least one brake line carrying pressure fluid between the master cylinder and the brake cylinders, at least one first brake line branch (17, 18) and at least one second brake line branch (20, 21) connected with the front and rear brake cylinders, at least one return line branch (27, 28, 31, 32) originating at said at least one first brake line branch and said at least one second brake line branch at a connecting point (25, 26, 29, 30), the at least one first brake line branch (17, 18) and the at least one second brake line branch (20, 21) are joined with one another by means of at least one connecting line (64, 65), and that a pressure control devise (68, 69) is disposed in the at least one connecting line (64, 65), a throttle (70, 71) is disposed in the at least one connecting line (64, 65), and a non-spring-loaded check valve (53, 54) is disposed in the at least one second brake line branch (20, 21) associated with at least one rear wheel of the motor vehicle.

19. A hydraulic brake system with an antilock mechanism especially for motor vehicles provided with a master cylinder and front and rear brake cylinders, having at least one brake line carrying pressure fluid between the master cylinder and the brake cylinders, at least one first brake line branch (17, 18) and at least one second brake line branch (20, 21) connected with the front and rear brake cylinders, at least one return line branch (27, 28, 31, 32) originating at said at least one first brake line branch and said at least one second brake line branch at a connecting point (25, 26, 29, 30), the at least one first brake line branch (17, 18) and the at least one second brake line branch (20, 21) are joined with one another by means of at least one connecting line (64, 65), and that a pressure control device (68, 69) is disposed in the at least one connecting line (64, 65), and an inlet valve (80, 81), which is closed in an absence of current, is disposed in the at least one second brake line branch (20, 21) associated with at least one rear wheel of a vehicle.

20. A hydraulic brake system as defined by claim 19, in which a check valve (82, 83) is disposed in a bypass line parallel with said inlet valve (80, 81) disposed in said at least one second brake line branch (20, 21) associated with the at least one rear wheel of the motor vehicle, and said inlet valve (80, 81) is closed in the absence of current.

21. A hydraulic brake system as defined by claim 19, in which the pressure control device (68, 69) functions as a spring-loaded pressure difference valve which reduces the pressure on an outlet side of said pressure control device (68, 69) by a fixed value in relation to the pressure of the pressure fluid on an inlet side of said pressure control device.

22. A hydraulic brake system with an antilock mechanism especially for motor vehicles provided with a master cylinder and front and rear brake cylinders, having at least one brake line carrying pressure fluid between the master cylinder and the brake cylinders, at least one first brake line branch (17, 18) and at least one second brake line branch (20, 21) connected with the front and rear brake cylinders, at least one return line branch (27, 28, 31, 32) originating at said at least one first brake line branch and said at least one second brake line branch at a connecting point (25, 26, 29, 30), the at least one first brake line branch (17, 18) and the at least one second brake line branch (20, 21) are joined with one another by means of at least one connecting line (64, 65), and that a pressure control device (68, 69) is disposed in the at least one connecting line (64, 65), a throttle (70, 71) is disposed in the at least one connecting line (64, 65), and an inlet valve (80, 81), which is closed in an absence of current, is disposed in the at least one second brake line branch (20, 21) associated with at least one rear wheel of a vehicle.

23. A hydraulic brake system with an antilock mechanism especially for motor vehicles provided with a master cylinder and front and rear brake cylinders, having at least one brake line carrying pressure fluid between the master cylinder and the brake cylinders, at least one first brake line branch (17, 18) and at least one second brake line branch (20, 21) connected with the front and rear brake cylinders, at least one return line branch (27, 28, 31, 32) originating at said at least one first brake line branch and said at least one second brake line branch at a connecting point (25, 26, 29, 30), the at least one first brake line branch (17, 18) and the at least one second brake line branch (20, 21) are joined with one another by means of at least one connecting line (64, 65), and that a pressure control device (68, 69) is disposed in the at least one connecting line (64, 65), the at least one connecting line (64, 65) joins together the at least one first brake line branch (17, 18) associated with at least one front wheel of the vehicle and the at least one second brake line branch (20, 21) associated with at least one rear wheel of the vehicle, and an inlet valve (80, 81), which is closed in an absence of current, is disposed in the at least one second brake line branch (20, 21) associated with the at least one rear wheel of the vehicle.

24. A hydraulic brake system with an antilock mechanism especially for motor vehicles provided with a master cylinder and front and rear brake cylinders, having at least one brake line carrying pressure fluid between the master cylinder and the brake cylinders, at least one first brake line branch (17, 18) and at least one second brake line branch (20, 21) connected with the front and rear brake cylinders, at least one return line branch (27, 28, 31, 32) originating at said at least one first brake line branch and said at least one second brake line branch at a connecting point (25, 26, 29, 30), the at least one first brake line branch (17, 18) and the at least one second brake line branch (20, 21) are joined with one another by means of at least one connecting line (64, 65), and that a pressure control device (68, 69) is disposed in the at least one connecting line (64, 65), and a bypass line (75, 76) that extends parallel to the at least one connecting line (64, 65) is embodied by means of two return line branches (27, 31, 28, 32) that are connected in series with one another.

* * * * *